(12) United States Patent
Ahn (10) Patent No.: US 10,723,053 B2
(45) Date of Patent: Jul. 28, 2020

(54) SKIN-FORMING APPARATUS AND METHOD

(71) Applicants: Hyundai Motor Company, Seoul (KR); Kia Motors Corporation, Seoul (KR)

(72) Inventor: Gye Young Ahn, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 829 days.

(21) Appl. No.: 14/957,535

(22) Filed: Dec. 2, 2015

(65) Prior Publication Data

US 2016/0354959 A1 Dec. 8, 2016

(30) Foreign Application Priority Data

Jun. 3, 2015 (KR) .................. 10-2015-0078421

(51) Int. Cl.
*B29C 45/34* (2006.01)
*B29C 45/76* (2006.01)
*B29K 105/04* (2006.01)

(52) U.S. Cl.
CPC .............. *B29C 45/34* (2013.01); *B29C 45/76* (2013.01); *B29C 2945/7604* (2013.01); *B29C 2945/7626* (2013.01); *B29C 2945/76652* (2013.01); *B29K 2105/043* (2013.01)

(58) Field of Classification Search
None
See application file for complete search history.

(56) References Cited

U.S. PATENT DOCUMENTS

| 3,737,266 A | * | 6/1973 | Yamamoto | B29C 33/08 249/113 |
| 4,474,717 A | * | 10/1984 | Hendry | B29C 44/0461 264/328.16 |
| 2005/0236726 A1 | * | 10/2005 | Niewels | B29C 45/34 264/40.1 |

FOREIGN PATENT DOCUMENTS

| CN | 100519141 C | 7/2009 |
| KR | 0123397 Y1 | 5/1998 |
| KR | 10-2004-0042678 A | 5/2004 |
| KR | 20-2009-0004316 U | 5/2009 |
| KR | 10-2011-0023652 A | 3/2011 |
| KR | 10-2012-0027643 A | 3/2012 |
| KR | 10-2013-0074935 A | 7/2013 |

(Continued)

*Primary Examiner* — Jeffrey M Wollschlager
*Assistant Examiner* — Armand Melendez
(74) *Attorney, Agent, or Firm* — Morgan, Lewis & Bockius LLP (57) ABSTRACT

Provided are skin-forming apparatus and method. The apparatus includes a mold having a cavity defining a skin-forming space and a vent core system coupled to the mold for discharging residual gas. The vent core system includes a vent hole formed in the mold and connecting the cavity of the mold to the outside, a vent core mounted in the mold for opening an inlet of the vent hole to discharge the residual gas or closing the inlet of the vent hole to block leakage of the resin, a temperature sensor disposed in a resin flow course in the cavity while being spaced apart from the inlet of the vent hole by a predetermined distance, a controller, and a core driving unit for driving the vent core to perform opening and closing operations based on the control signal of the controller in accordance with the temperature measured by the temperature sensor.

6 Claims, 8 Drawing Sheets

(56) References Cited

FOREIGN PATENT DOCUMENTS

| | | | |
|---|---|---|---|
| KR | 20130074935 A | * | 7/2013 |
| KR | 10-2015-0017243 A | | 2/2015 |
| WO | WO 2005/102660 A1 | | 11/2005 |

* cited by examiner

OPENING

FIG. 3A

BLOCKING

SKIN-FORMING APPARATUS AND METHOD

CROSS-REFERENCE TO RELATED APPLICATION

The present application claims priority of Korean Patent Application Number 10-2015-0078421 filed Jun. 3, 2015, the entire contents of which application are incorporated herein for all purposes by this reference.

BACKGROUND

Technical Field

The present disclosure relates to skin-forming apparatus and method. More particularly, it relates to skin-forming apparatus and method that improve resin flowability and formability in injection molding of a skin and prevent product defects due to generation of gas bubbles, thereby improving external quality of a product.

Background Art

Generally, various conveniences and safety structures for a pleasant and comfortable indoor environment are mounted in a vehicle. Particularly, a crash pad is mounted in front of a driver's seat and the front passenger's seat as an indoor interior member that protects drivers and passengers when a vehicle crash occurs.

A general crash pad is manufactured using foam to exhibit elastic cushioning performance and a shock-absorbing property while exhibiting an aesthetically pleasing appearance as an interior member of a vehicle.

The crash pad may be classified into a soft crash pad and a hard crash pad. The soft crash pad includes three layers (skin, core, and foam layer), and the hard crash pad includes only one layer (core) formed by injection molding of resin.

Specifically, the soft crash pad includes a skin as a surface member for providing an aesthetically pleasing surface state, a core functioning as a frame of the crash pad, and a foam layer, such as polypropylene (PP) foam or polyurethane (PU) foam, interposed between the skin and the core for providing cushioning performance and shock-absorbing performance.

In recent years, the soft crash pad has been widely used due to advantages, such as an aesthetically pleasing appearance, better texture and cushioning, and high shock-absorbing performance.

Meanwhile, the skin of the soft crash pad, which is a portion that provides an aesthetically pleasing surface to make the interior of the vehicle pleasant and luxurious, is generally manufactured using a powder slush molding (PSM) method or a vacuum forming method.

The PSM method, which is one of the methods of manufacturing a skin of a crash pad, has advantages in design and embossing. In the PSM method, a heated mold and a material powder box are rotated to form the skin of the crash pad.

In recent years, environmentally-friendly materials, such as thermoplastic olefin (TPO) or thermoplastic urethane (TPU), have been mainly used instead of conventional polyvinyl chloride powder when using the PSM method.

The vacuum forming method is a method of manufacturing a skin of a crash pad that has been most generally used for a long time. In the vacuum forming method, a preheated TPO sheet is suctioned to a mold using a vacuum and then cooled to form the skin. A sheet having grains or a mold having grains is used to emboss the skin.

When the PSM method is used, however, a powdering process for processing material pellets, such as TPU pellets, into powder is needed, thereby increasing the cost. In addition, the mold is expensive, and excessive material scraps are generated.

For the vacuum forming method, on the other hand, when a sheet having an embossed pattern transferred thereto is formed in a vacuum, the embossed pattern may be stretched. In addition, excessive material scraps are generated.

Meanwhile, an injection molding method of injecting a raw resin, such as TPU, into a cavity of a mold through a gate using an injector and forming a skin of a crash pad may be used as another method of manufacturing a skin of a crash pad.

When a raw resin is injected into a cavity defined between an upper mold unit and a lower mold unit to form a thin-film skin, however, flowability of the resin is not satisfactory due to residual gas in the mold. In particular, gas bubbles are generated in a portion of the mold where the resin is collected.

Figure 1A:
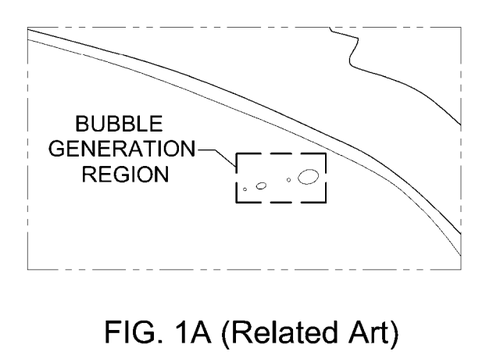
FIG. 1A and FIG. 1B are views showing problems with conventional injection molding.
Figure 1B:
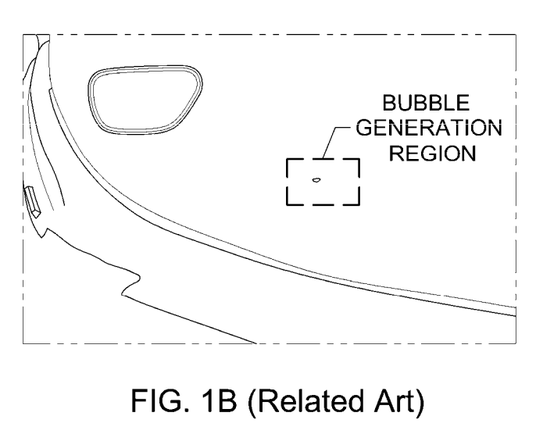

FIGS. 1A and 1B are views exemplarily showing a skin 1 manufactured by injection molding. As shown, the skin is not properly formed or a hole is formed at a portion of the skin where gas bubbles are generated.

The information disclosed in this Background section is only for enhancement of understanding of the general background of the invention and should not be taken as an acknowledgement or any form of suggestion that this information forms the prior art already known to a person skilled in the art.

SUMMARY OF THE DISCLOSURE

The present invention has been made in an effort to solve the above-described problems associated with prior art and/or other problems, and it is an object of the present invention to provide skin-forming apparatus and method that may reduce waste of materials, manufacturing time, cost, and investment.

It is another object of the present invention to provide skin-forming apparatus and method that may improve resin flowability and formability in injection molding of a skin and prevent product defects due to generation of gas bubbles, thereby improving external quality of a product.

In one aspect, the present invention provides a skin-forming apparatus including a mold having a cavity defining a skin-forming space; and a vent core system coupled to the mold for discharging residual gas in the skin-forming space to an outside during injection of resin supplied from an injector, wherein the vent core system comprises: a vent hole formed in the mold and connecting the cavity of the mold to the outside; a vent core mounted in the mold for opening an inlet of the vent hole to discharge the residual gas in the cavity through the vent hole or closing the inlet of the vent hole to block leakage of the resin; a temperature sensor mounted in the mold and located in a resin flow course in the cavity while being spaced apart from the inlet of the vent hole by a predetermined distance; a controller for outputting a control signal for opening or closing the inlet of the vent hole based on a temperature measured by the temperature sensor; and a core driving unit for driving the vent core to perform opening and closing operations based on the control signal of the controller.

In another aspect, the present invention provides a skin-forming method including: injecting resin into a skin-forming space formed by a cavity of a mold; determining, using a controller, whether a temperature measured by a temperature sensor mounted in a resin flow course while being spaced apart from an inlet of a vent hole located at one side of the cavity by a predetermined distance is equal to or higher than a predetermined value while gas in the skin-forming space is discharged to an outside of the mold through the vent hole of the mold during injection of the resin; and driving, using a core driving unit, a vent core mounted in the mold to close the inlet of the vent hole to prevent leakage of the resin through the vent hole, if the temperature measured by the temperature sensor is equal to or higher than the predetermined value.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention may be applied to the manufacture of a skin of a vehicle interior member. In particular, the present invention may be usefully applied to the manufacture of a skin of a crash pad through injection molding.

Figure 2:
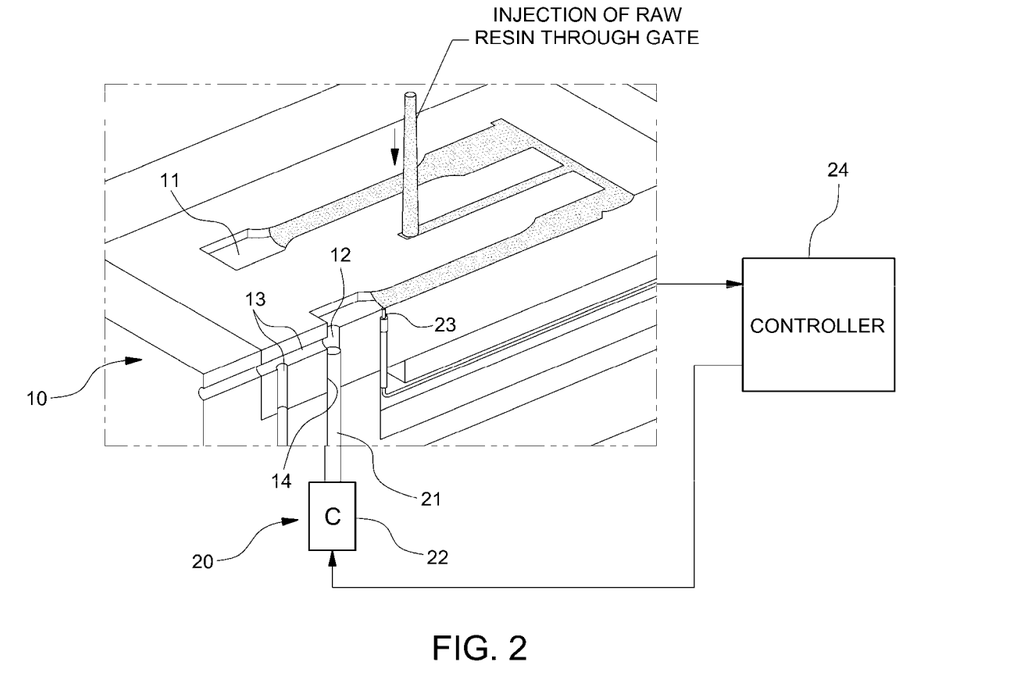
FIG. 2 is a perspective view, in section, illustrating a mold device for injection molding of a skin as a skin-forming apparatus according to an embodiment of the present invention.
Figure 3A:
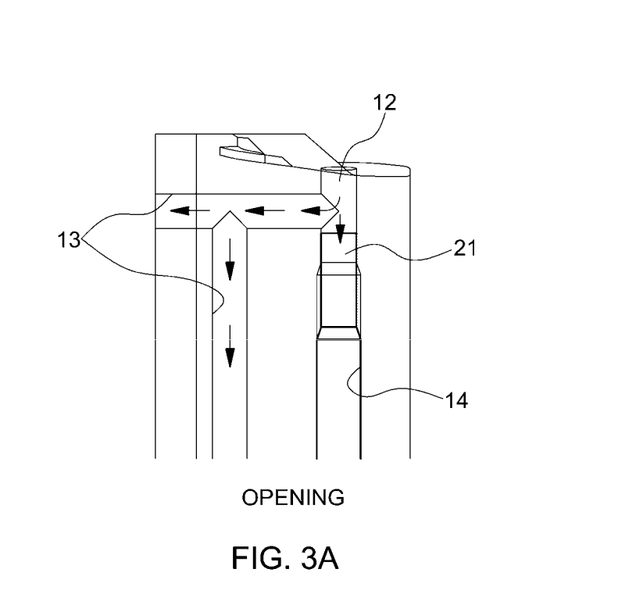
FIG. 3A and FIG. 3B are sectional views illustrating operating states of a vent core in the skin-forming apparatus according to an embodiment of the present invention.
Figure 3B:
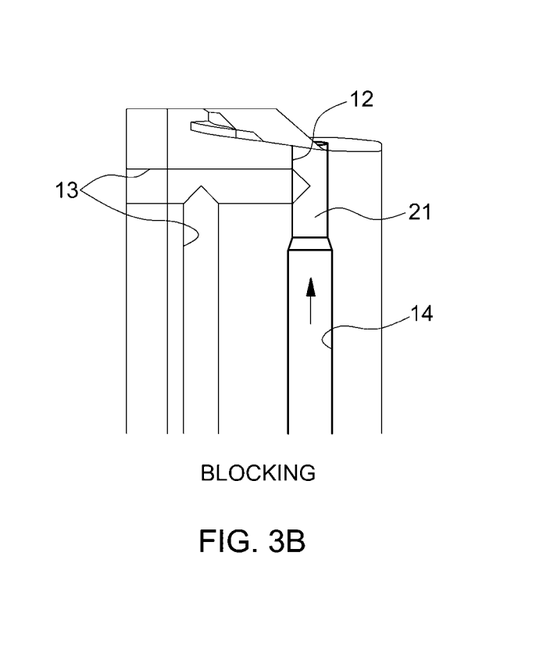

FIG. 2 is a perspective view, in section, illustrating a mold device for injection molding of a skin as a skin-forming apparatus according to an embodiment of the present invention, and FIG. 3A and FIG. 3B are sectional views illustrating operating states of a vent core 21 in the molding device according to the embodiment of the present invention.

Figure 4:
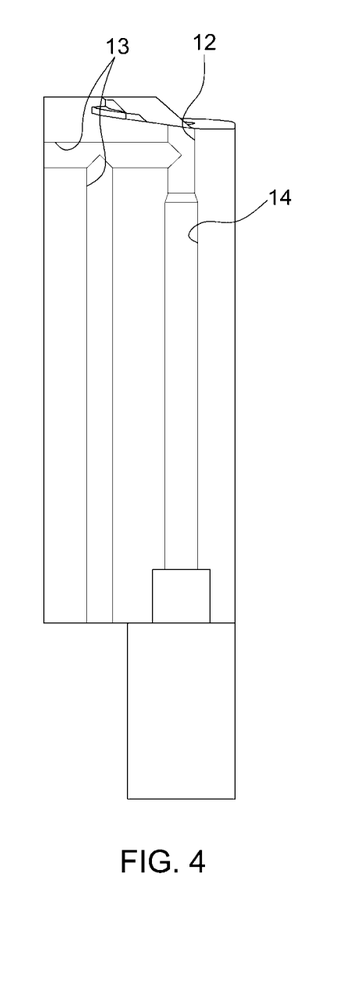
FIG. 4 is a view illustrating a vent hole and a mounting hole of a mold in the skin-forming apparatus according to an embodiment of the present invention.
Figure 5A:
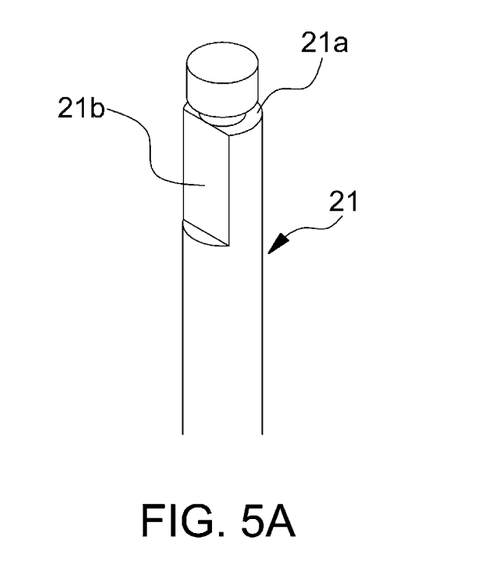
FIG. 5A and FIG. 5B are detailed views exemplarily illustrating the shape of the vent core in the skin-forming apparatus according to an embodiment of the present invention.
Figure 5B:
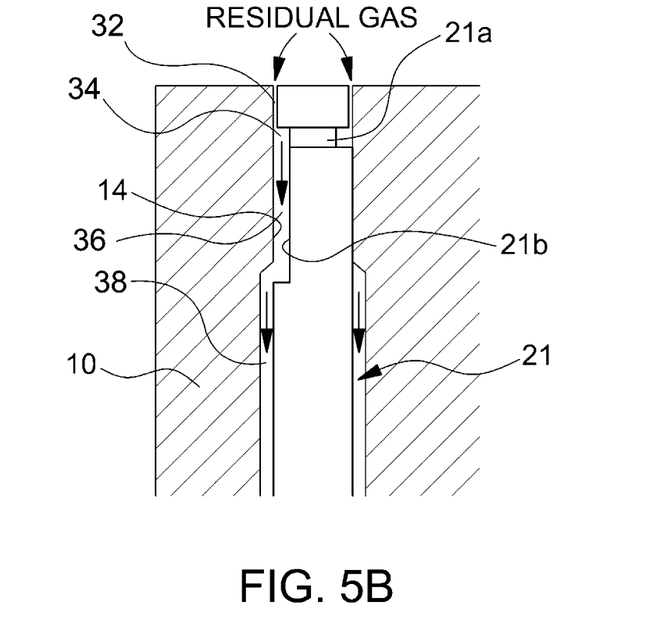

In addition, FIG. 4 is a view illustrating a vent hole 13 and a mounting hole 14 of a second mold 10 in the skin-forming apparatus according to the embodiment of the present invention, and FIG. 5A and FIG. 5B are detailed views exemplarily illustrating the shape of the vent core 21 in the molding device according to the embodiment of the present invention. FIG. 6A, FIG. 6B, FIG. 6C and FIG. 6D are views exemplarily illustrating operating states of the skin-forming apparatus according to the embodiment of the present invention during injection molding.

As shown, the skin-forming apparatus according to the embodiment includes a mold device for injection molding of a skin and a vent core system 20 for gas discharge.

The mold device may include a first mold and a second mold 10. In a state in which two molds are coupled to each other, a raw resin supplied from an injector is injected into a product-forming space in the mold formed by a cavity 11 through a gate to form a thin skin.

In manufacturing a skin of a crash pad, the raw resin may be TPU.

Although the second mold 10, at which the vent core system 20 is mounted, is shown in FIG. 2, the first mold, which is the mate to the second mold 10, is omitted (for illustration purposes) from FIG. 2 other than a schematic shape of the gate of the first mold, through which the raw resin is injected.

In addition, the cavity 11, which forms the product-forming space in a state in which the first mold and the second mold 10 are coupled to each other, is formed in a shape that is capable of forming a skin product having a thin thickness (e.g. 1 mm) In FIG. 2, the shape of the cavity 11 is schematically shown.

Of course, for a mold that forms a thin film type crash pad skin, the cavity 11 in the mold may be formed in a shape that is capable of forming a skin of an actual crash pad.

As shown, the second mold 10 is provided with the vent core system 20 for discharging residual gas in an inner space (product-forming space) of the cavity 11 to the outside during injection of resin. The vent core system 20 includes a vent hole 13, a vent core 21, a core driving unit 22, a temperature sensor 23, and a controller 24.

The vent hole 13, which is connected to the outside such that gas is discharged from the inner space of the cavity 11, extends through the second mold 10. The vent hole 13 is formed in the shape of a long channel connected between an inlet 12 located so as to be connected to one side of the inside of the cavity 11 and an outlet located at the outside of the second mold 10.

The vent hole 13 functions as a gas discharge channel for discharging residual gas in the inner space of the cavity 11 to the outside during injection of resin so as to solve a problem that a non-forming space is generated in a product due to generation of gas bubbles. As a result, quality deterioration due to gas bubbles is prevented.

In addition, the vent hole 13 discharges residual gas collected on the tip of resin injected into the cavity 11 to the outside of the mold during injection of resin to generate an atmospheric pressure difference in the inner space of the cavity along a resin flow course, thereby improving resin flowability. As a result, formability and external quality of a product are improved.

In addition, the vent core 21, which is formed in the shape of a pin, is mounted in the second mold 10 such that the vent core 21 moves forward and backward to open and close the inlet 12 of the vent hole 13, and the core driving unit 22 is mounted in the second mold 10 for opening and closing the vent core 21.

The vent core 21 is inserted in the mounting hole 14 of the second mold 10 formed separately from the vent hole 13 such that the vent core 21 moves forward and backward. The vent core 21 moves forward and backward to open and close the inlet 12 of the vent hole 13.

The core driving unit 22 may be a cylinder moving the vent core forward and backward in a state in which the vent core 21 is coupled. For example, the core driving unit 22 may be a pneumatic cylinder.

In this structure, the vent hole 13 may be formed in a direction perpendicular (or substantially perpendicular) to or parallel (or substantially parallel) to the mounting hole 14, in which the vent core 21 is mounted. However, in the present invention, a direction or course in which the vent hole 13 is formed in the mold is readily adjustable and is not particularly restricted.

In addition, as shown in FIG. 4, the vent hole 13 may be formed in the shape of channels diverging in a plurality of directions although the vent hole 13 may be a long hole.

In addition, the inlet 12 of the vent hole may be located at a position where gas is mainly collected or a position where defects, such as pores, non-forming spaces, and holes, are generated in a product due to gas bubbles in consideration of the shape of a product and the cavity.

In addition, the vent core system 20 of the present invention includes the temperature sensor 23 mounted in the mold 10 such that the temperature sensor 23 is located in the vicinity of the inlet of the vent hole while being spaced apart from the inlet 12 of the vent hole by a predetermined distance in the resin flow course in the cavity 11.

A signal of the temperature sensor 23 is input to the controller 24. The controller 24 outputs a control signal for controlling the opening and closing operation of the vent core 21, i.e. a control signal for controlling the core driving unit 22, based on the signal (temperature detection value) of the temperature sensor 23.

Figure 7:
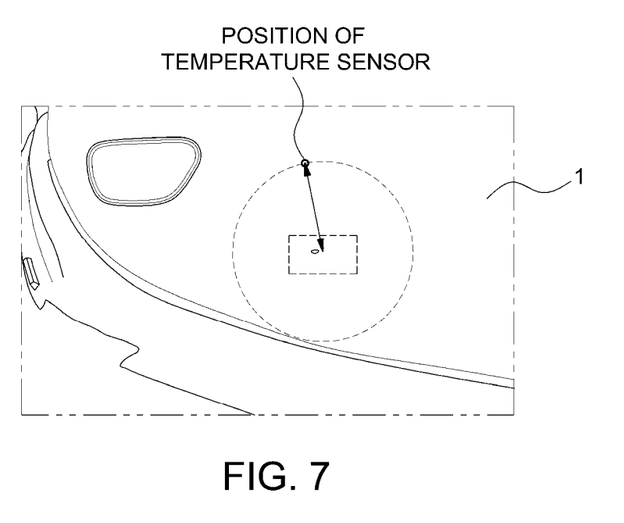
FIG. 7 is a view illustrating the position of an inlet of the vent hole and the position of a temperature sensor in the skin-forming apparatus according to an embodiment of the present invention.

FIG. 7 is a view illustrating the positions of the inlet of the vent hole and the temperature sensor. FIG. 7 shows the positions of the inlet of the vent hole and the temperature sensor mounted in the second mold based on the position of a defective portion of a skin 1 formed according to the conventional art due to residual gas, i.e. the position where a defect, such as a hole, is formed in the figure.

As shown, the inlet 12 (see FIG. 2) of the vent hole of the mold is located at a position corresponding to the defective portion in the product generated due to residual gas, and the temperature sensor 23 (see FIG. 2) is disposed at a predetermined distance from the inlet 12 of the vent hole.

The temperature sensor 23 is mounted in the resin flow course in the cavity 11, along which resin flows to the inlet 12 of the vent hole, as shown in FIG. 2. When the resin injected into the cavity 11 reaches the temperature sensor before the resin reaches the inlet 12 of the vent hole, a temperature detection value of the temperature sensor 23 increases to a predetermined value or higher.

Upon determining from the signal of the temperature sensor 23 that the temperature detection value of the temperature sensor 23 has increased to the predetermined value or higher, the controller 24 determines that the resin injected into the cavity 11 has reached the vicinity of the inlet 12 of the vent hole, and outputs a control signal for closing the inlet 12 of the vent hole before the resin reaches the inlet 12 of the vent hole.

Accordingly, the core driving unit (pneumatic cylinder) 22 may move the vent core 21 to close the inlet 12 of the vent hole, thereby preventing leakage of the resin through the vent hole 13.

Meanwhile, FIG. 5 exemplarily shows the shape of the vent core 21. For example, a micro gap for discharging residual gas while blocking leakage of resin may be provided between the tip of the vent core 21 and the inside of the inlet 12 of the vent hole such that the residual gas is continuously discharged to the outside in a state in which the vent core 21 closes the inlet 12 of the vent hole.

That is, the residual gas in the inner space of the cavity may be further discharged through the gap while the resin injected into the cavity 11 moves from the position of the temperature sensor 23 to the position of the inlet 12 of the vent hole in a state in which the inlet 12 of the vent hole is closed by the vent core 21.

Referring to FIG. 5, there is shown an exemplary shape of the vent core 21 for discharging residual gas in a state in which the vent hole is closed. The vent core 21 is provided with a step 21a configured in the shape of a long groove extending along the circumference thereof at a rear portion distant from the end of the tip of the vent core 21 by a predetermined distance in a longitudinal direction of the core in a state in which the micro gap 32 for discharging residual gas while blocking leakage of resin is provided between the outside of the tip of the vent core 21 and the inside of the inlet 12 of the vent hole.

In addition, the vent core 21 is provided at one side of the rear portion of the step 21a, i.e. one side of the lower portion of the step 21a in the figure, with a groove-shaped chamber 21b that is capable of providing a gap space having a larger volume than the step 21a between the inside of the inlet 12 of the vent hole and the vent core 21.

The chamber 21b is formed at one side of the circumference of the vent core 21 in the shape of a long groove having a predetermined length in the longitudinal direction of the core. A larger gap than at the tip of the vent core 21 is provided between the rear portion of the chamber 21b of the vent core 21, i.e. the lower portion of the step 21b in the figure, and the inside of the mounting hole 14 such that gas is easily discharged to the outside.

A gap space 34 (hereinafter be referred to as a 'step space') between the inside of the inlet 12 of the vent hole and the step 21a of the vent core 21, a gap space 36 (hereinafter be referred to as a 'chamber space') between the inside of the inlet 12 of the vent hole and the chamber 21b of the vent core 21, and a gap 38 between the inside of the mounting hole 14 and the rear portion of the chamber 21b are connected to one another such that a gas discharge course having a larger space than the gap at the tip of the vent core 21 is formed between the inlet 12 of the vent hole and the mounting hole 14.

The step space and the chamber space are structures that more easily discharge residual gas in the cavity 11 through the gap spaces in a state in which the vent hole is closed. When the vent core 21 closes the inlet 12 of the vent hole, the residual gas may move to the chamber space, which is a more extended space, through the step space, be collected, and then be discharged.

Hereinafter, the operating states of the skin-forming apparatus during injection molding will be described with reference to FIGS. 6A-6D.

Figure 6A:
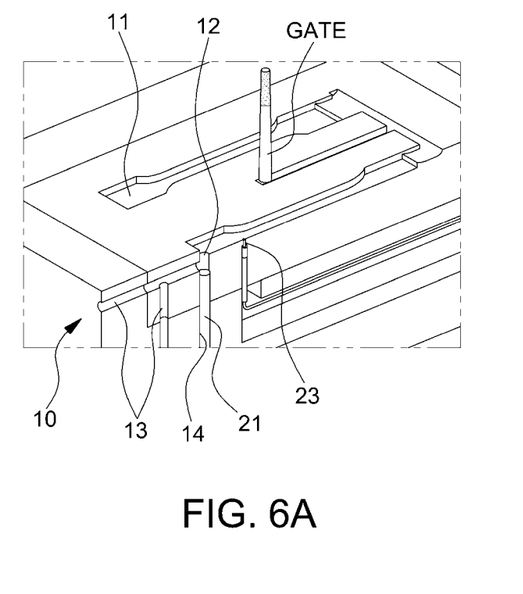
FIG. 6A, FIG. 6B, FIG. 6C and FIG. 6D are views exemplarily illustrating operating states of the skin-forming apparatus according to an embodiment of the present invention during injection molding.

FIG. 6A shows an injection start state, i.e. a state in which a raw resin starts to be injected through the gate of the first mold. At this time, the vent core 21 is in a retreated state, and the inlet 12 of the vent hole is in an open state.

In this state, injection is started, and resin is injected into the cavity 11 and, at the same time, gas present in the cavity 11 is discharged to the outside through the vent hole 13.

Figure 6B:
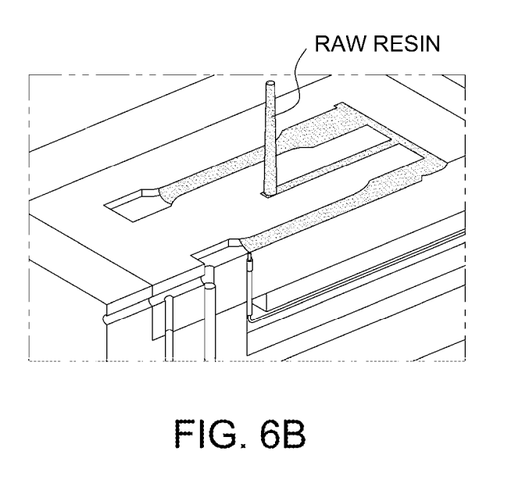

Subsequently, as shown in FIG. 6B, the resin injected into the cavity 11 moves. When the resin reaches the position of the temperature sensor 23, the controller 24 controls driving of the venting core system 20 based on a signal from the temperature sensor 23.

Figure 6C:
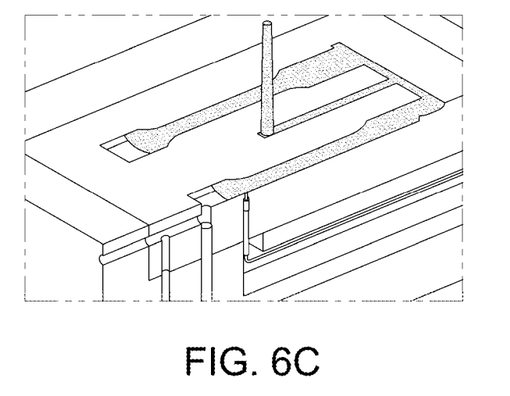
Figure 6D:
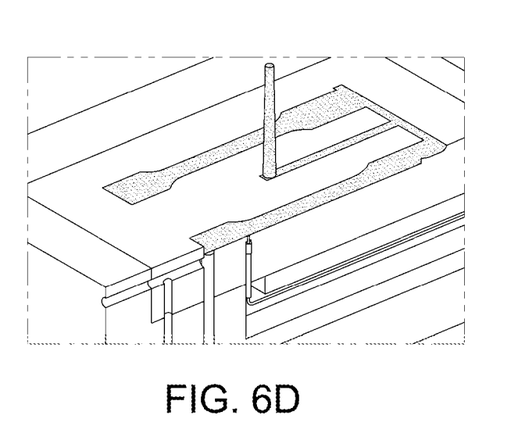

That is, as shown in FIGS. 6C and 6D, the core driving unit 22 (see FIG. 2) is driven for the vent core 21 to advance (in the figure, raise) according to a control signal output from the controller 24. As a result, the inlet 12 of the vent hole is closed before the arrival of the resin.

In a state in which the inlet 12 of the vent hole is closed by the vent core 21 as described above, the leakage of the resin through the vent hole 13 may be prevented.—In a state in which the inlet 12 of the vent hole is closed, gas may be further discharged through the micro gap between the vent core 21 and the vent hole 13.

In the present invention, as described above, residual gas in the inner space of the cavity is discharged to the outside when manufacturing a thin-film skin product having a thin thickness by injection molding, thereby improving resin flowability and formability, preventing product defects due to generation of gas bubbles, and improving external quality of a product.

As is apparent from the above description, in a skin-forming apparatus and method according to the present invention, a skin is manufactured through injection molding, thereby reducing waste of materials, manufacturing time, cost, and investment. In addition, a vent core system that discharges residual gas is applied, thereby improving resin flowability and formability, preventing product defects due to generation of gas bubbles, and improving external quality of a product.

The present invention may be applied to the manufacture of a skin of a vehicle interior member. In particular, the present invention may be usefully applied to the manufacture of a skin of a crash pad through injection molding.

For convenience in explanation and accurate definition in the appended claims, the terms "inside" or "outside", "forward" or "backward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A skin-forming apparatus comprising:
   a mold having a cavity defining a skin-forming space; and
   a vent core system coupled to the mold for discharging residual gas in the skin-forming space to an outside during injection of resin supplied from an injector, wherein the vent core system comprises:
   a vent hole formed in the mold and connecting the cavity of the mold to the outside to discharge the residual gas in the cavity through the vent hole;
   a vent core mounted in the mold for opening an inlet of the vent hole to discharge the residual gas in the cavity through the vent hole or closing the inlet of the vent hole to block leakage of the resin, wherein the inlet of the vent hole is positioned in the cavity and wherein the vent core is inserted in a mounting hole of the mold formed separately from the vent hole such that the vent core moves forward and backward in the mounting hole;
   a temperature sensor mounted in the mold and located in a resin flow course in the cavity while being spaced apart from the inlet of the vent hole by a predetermined distance;
   a controller for outputting a control signal for opening or closing the inlet of the vent hole by a tip of the vent core, based on a temperature measured by the temperature sensor; and
   a core driving unit for driving the vent core to perform opening and closing operations based on the control signal of the controller,
   wherein a gap for continuously discharging residual gas while the vent core blocks leakage of resin is configured to be provided between an outer surface of the vent core and an inner wall of the mounting hole such that the residual gas is continuously discharged to the outside through the gap formed between the outer surface of the vent core and the inner wall of the mounting hole while the vent core closes the inlet of the vent hole to block the leakage of the resin.

2. The skin-forming apparatus of claim 1, wherein the controller outputs the control signal for closing the inlet of the vent hole when the temperature measured by the temperature sensor is equal to or higher than a predetermined value.

3. The skin-forming apparatus of claim 1, wherein the vent core is a pin-shaped core mounted along a mounting hole of the mold such that the tip of the vent core moves forward and backward to open and close the inlet of the vent hole, and the core driving unit is a cylinder to which the vent core is coupled.

4. The skin-forming apparatus of claim 1, wherein the vent core is configured such that a gas discharge channel is formed at a rear portion of the tip of the vent core, wherein the gas discharge channel includes a more extended space than the gap and is defined between the inlet of the vent hole and an inside of the mounting hole such that the residual gas discharged through the gap is continuously discharged to the outside through the gas discharge channel.

5. The skin-forming apparatus of claim 4, wherein the gas discharge channel comprises:
   a step space of the extended space, the step space formed between an inside of the inlet and a groove-shaped step extending along a circumference of the vent core at a rear portion distant from an end of the tip of the vent core by a predetermined distance in a longitudinal direction of the vent core;
   a chamber space formed between the inside of the inlet and a groove-shaped chamber formed at one side of the rear portion of the groove-shaped step of the vent core, wherein the chamber space is larger than the step space; and
   an additional gap between a rear portion of the groove-shaped chamber of the vent core and the inside of the mounting hole.

6. A skin-forming apparatus comprising:
   a mold having a cavity defining a skin-forming space; and
   a vent core system coupled to the mold for discharging residual gas in the skin-forming space to an outside during injection of resin supplied from an injector, wherein the vent core system comprises:
   a vent hole formed in the mold and connecting the cavity of the mold to the outside to discharge the residual gas in the cavity through the hole;
   a vent core mounted in the mold for opening an inlet of the vent hole to discharge the residual gas in the cavity through the vent hole or closing the inlet of the vent hole to block leakage of the resin, wherein the inlet of the vent hole is positioned in the cavity and the vent core is inserted in a mounting hole of the mold formed separately from the vent hole such that the vent core moves forward and backward in the mounting hole;
   a temperature sensor mounted in the mold and located in a resin flow course in the cavity while being spaced apart from the inlet of the vent hole by a predetermined distance;
   a controller for outputting a control signal for opening or closing the inlet of the vent hole by a tip of the vent core, based on a temperature measured by the temperature sensor; and
   a core driving unit for driving the vent core to perform opening and closing operations based on the control signal of the controller,
   wherein the vent core is a pin-shaped core mounted along the mounting hole of the mold such that the tip of the vent core moves forward and backward to open and close the inlet of the vent hole, and the core driving unit is a cylinder to which the vent core is coupled, and
   wherein the vent core is configured such that a gap is formed between an outer surface of the pin-shaped core of the vent core and an internal wall of the mounting hole in a state in which the inlet of the vent hole is closed, for continuously discharging the residual gas through the gap while the vent core closes the inlet to block leakage of the resin.

* * * * *